UNITED STATES PATENT OFFICE.

BARTHOLOMEW BERGHAUSEN AND AUGUST L. KIESLING, OF COLOGNE, GERMANY.

IMPROVEMENT IN ARTIFICIAL FUEL.

Specification forming part of Letters Patent No. 175,550, dated April 4, 1876; application filed September 4, 1875.

*To all whom it may concern:*

Be it known that we, BARTHOLOMEW BERGHAUSEN and AUGUST LOUIS KIESLING, of Cologne, in the Empire of Germany, have invented Improvements in the Manufacture of Artificial Fuel.

The following description, forms a full and exact specification, wherein are set forth the nature and principles of the invention, by which the same may be distinguished from others of a similar class, together with such parts thereof as are claimed as new and are desired to be secured by Letters Patent of the United States.

The invention consists in the method of preparing, and the combining, of certain substances for the manufacture of an artificial fuel of such a composition that it burns readily but steadily, without flame, and, therefore, produces neither soot nor any of the deposits which always accompany flaming combustion.

In order to produce a uniform heat for the whole time of burning, we prefer to give our artificial fuel a parallelopipedic shape. By lighting fully one face of the fuel-cake, the combustion passes slowly and steadily through the whole cake. In consequence of this construction we are able to manufacture fuel-cakes burning any required number of hours, and producing a fixed temperature for the whole time of combustion, without any further attention.

To manufacture this fuel, we take charred or coked wood, brown-coal, coal peat, and coke, or residue of distillation of coal, separately or mixed together with the following ingredients, and in the following way: To the powdered fuel we add, first, such substances as are capable of supplying the fuel after ignition with oxygen, and of maintaining the combustion, even if very little air be supplied to the burning fuel. Such substances are nitrates, chlorates, manganates, and chromates; but we prefer the potassium or sodium salts of the same. By varying the percentage of these salts in the fuel, the same can be made to burn quicker or slower, as may be required. We, secondly, add some glutinous or binding substances, for the better consolidation of the powdered fuel, such as solutions or paste of starch, rice, farina, dextrine, vegetable gum, or of silicates of sodium or potassium. Thirdly, we add desiccating substances, such as sulphates of sodium or aluminium, which, by the preparation of the fuel, as described below, obtain the property of binding the hydroscopic moisture after the fuel is finished, and prevent, therefore, deliquescence of the salts and the decay of the organic glutinous substances.

The above ingredients are used in about the following proportions: To one hundred parts of the powdered fuel we add two to five per cent. of these substances, acting as supporters of combustion; and we prefer nitrate of sodium on account of its cheapness, and three to five per cent. of the binding ingredients, and about three per cent. of the desiccating substances.

To manufacture the fuel, we make a thin boiled paste of farinaceous, or a strong solution of the other binding substances. This, together with a concentrated (and we prefer a hot concentrated) solution of one of the supporters of combustion and of the desiccating substances, is thoroughly mixed in a suitable mixing-machine, with the powdered fuel, in the above-stated proportion. The well and uniformly mixed paste is then shaped and pressed in suitable molds, to give it the required form, and to consolidate the same. The cakes or bricks are then dried by artificial heat to drive out the moisture and the water of crystallization of the salts. After that they are packed, ready for use.

Having now described the nature of the invention, and the mode in which the same is to be carried out, we claim—

The herein-described fuel, consisting of carbonaceous matter, starch, sulphate of alumina, and nitrate of soda.

In testimony that we claim the foregoing we have hereunto set our hands this 11th day of May, 1875.

B. BERGHAUSEN.
AUG. L. KIESLING.

Witnesses:
EMIL LOHMANN,
GEORG HÖLSCHER.